B. M. TAKAHASHI.
INDICATOR FOR MOTOR VEHICLES.
APPLICATION FILED DEC. 7, 1915.
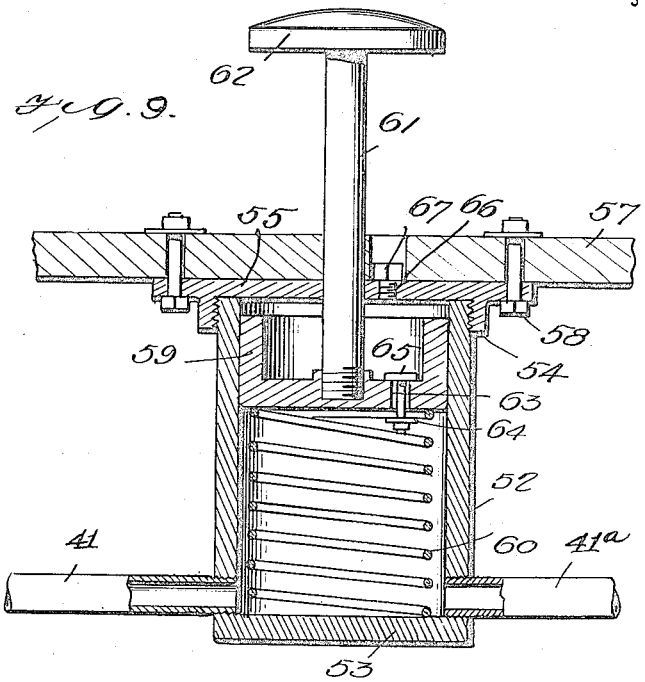
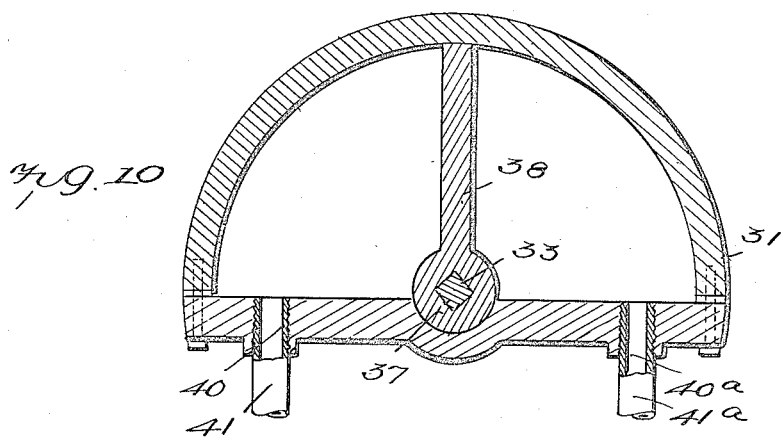
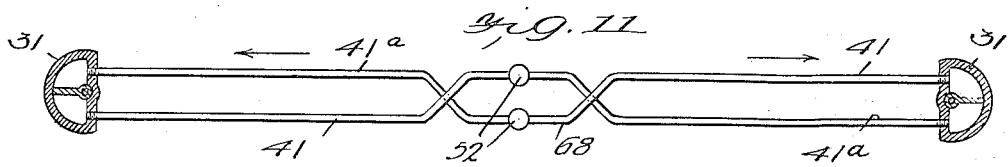
WITNESS
F. C. Barry
INVENTOR
Benjamin M. Takahashi
BY
ATTORNEYS

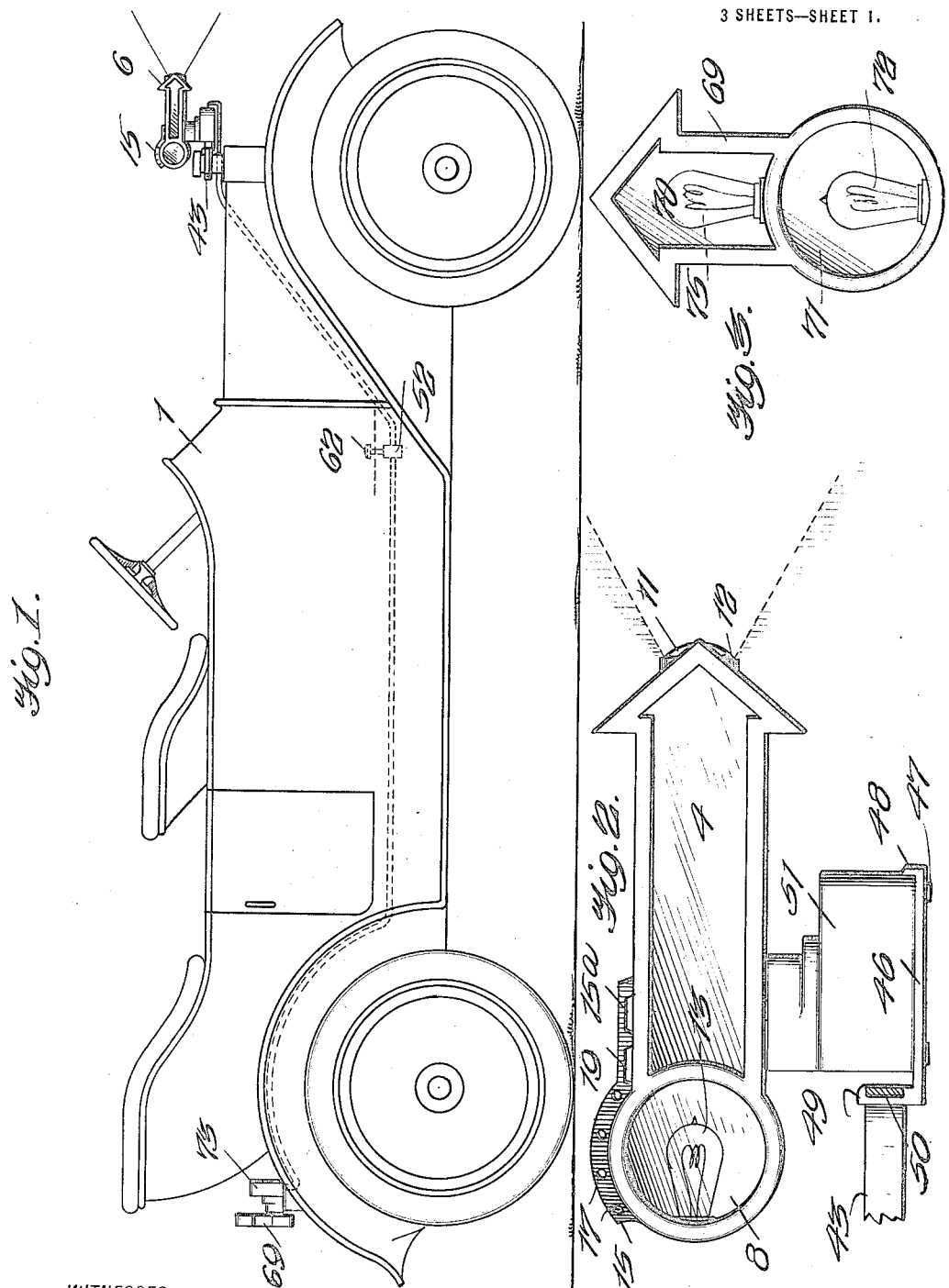

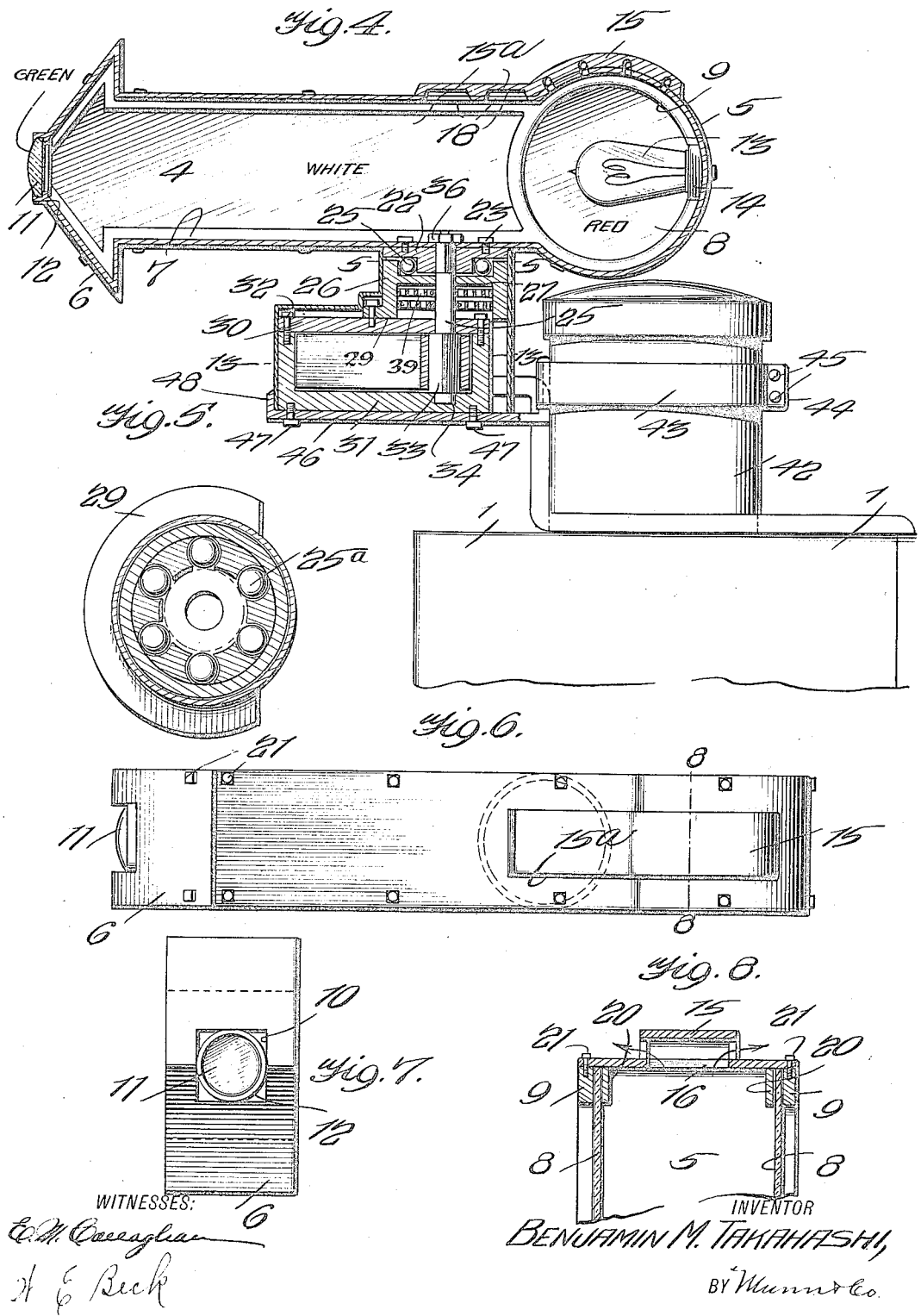

UNITED STATES PATENT OFFICE.

BENJAMIN MINOSAKU TAKAHASHI, OF HARLOWTON, MONTANA.

INDICATOR FOR MOTOR-VEHICLES.

1,229,167. Specification of Letters Patent. Patented June 5, 1917.

Application filed December 7, 1915. Serial No. 65,575.

*To all whom it may concern:*

Be it known that I, BENJAMIN M. TAKAHASHI, a citizen of Japan, and a resident of Harlowton, in the county of Meagher and State of Montana, have invented a new and useful Improvement in Indicators for Motor-Vehicles, of which the following is a specification.

My invention is an improvement in indicators for motor vehicles, and the invention has for its object to provide mechanism of the character specified, capable of being attached to existing motor vehicles for indicating to those concerned, such as pedestrians, chauffeurs and drivers of other vehicles, traffic officers and the like, the direction which the driver of the motor vehicle intends to take, as for instance, to the right, to the left or straight ahead, and wherein a visible signal is provided mounted to swing to either side and normally occupying a central position, together with controlling mechanism under the control of the chauffeur for swinging the signals.

In the drawings:—

Figure 1 is a side view of a motor vehicle provided with the improved indicator, Fig. 2 is a view of the front indicator detached, Fig. 3 is a similar view of the rear indicator, Fig. 4 is a longitudinal vertical section through the front indicator, Fig. 5 is a section on the line 5—5 of Fig. 4, Fig. 6 is a top plan view, Fig. 7 is a front view, Fig. 8 is a section on the line 8—8 of Fig. 6, Fig. 9 is a vertical section through the controlling mechanism for the indicator, Fig. 10 is a section on the line 10—10 of Fig. 4, Fig. 11 is a diagrammatic plan view of the controlling connections.

The present embodiment of the invention is shown in connection with a motor vehicle 1, two signals being provided, similar in construction but differing slightly in arrangement, the front signal being arranged on the hood of the vehicle and mounted to move in a horizontal plane, while the rear signal is mounted on the vehicle or on one of the mud guards, and is arranged to swing in a vertical plane.

The signal shown at the front in Fig. 1, is a casing 2 having the outline of an arrow or spear head, the casing comprising a body, which is rectangular in cross section and has open sides which are normally filled with sheets 4 of transparent material, as for instance, glass. At the inner end the casing has a cylindrical portion 5, and at the opposite end the casing has a triangular portion 6.

The sheets 4 of glass or other transparent material, are shaped to fit the body of the casing and the triangular portion 6, and these sheets are held in frames 7 which are shaped to fit within the inclosing casing 2. The ends of the cylindrical portion 5 are closed by sheets 8 of transparent material, as for instance, glass, and these sheets are held in circular frames 9, the said frames being integral with the holding frames 7.

An opening 10 is provided at the apex of the triangular portion 6, and within this opening is arranged a convex lens 11, the said lens being held in a frame 12. This lens is preferably colored green, and the circular sheets 8 are preferably colored red. The sheets 4 at the sides of the casing are white. The source of light is arranged within the portion 5 of the casing, the said source being an incandescent bulb 13, in the present instance, which is connected with a socket 14 at the axis of the casing. Means is provided for ventilating the interior of the casing, the said means being shown more particularly in Fig. 8.

A ventilator 15 is provided at the cylindrical portion of the indicator and this ventilator is extended forwardly over the adjacent portion of the top of the casing as indicated at 15$^a$. The ventilator is spaced above the top of the casing and the portion 15 is curved to correspond with the peripheral curve of the portion 5 of the casing.

The portion 5 of the casing is provided with a series of transverse slots 16 at the ventilator, and these slots communicate with openings 17 in the sides of the ventilator. The body of the casing has openings 18 in its top, and the portion 15$^a$ of the ventilator has openings 19 in its sides registering with the openings 18. Thus the free egress of the heated air is permitted.

It will be noticed from an inspection of Fig. 8 that the sheets 8 of transparent material abut against ribs 20, secured to the interior of the casing, and the frames 7—9 before mentioned, are held in place against the sheets by screws 21, which are passed through the body of the portion 5 of the casing into engagement with the frame. The frames 7—9 are held in place by other screws 21, as shown more particularly in Fig. 6.

The signal is mounted to swing in a horizontal plane and to permit the swinging movement one of the sections 22 of a turn table is secured to the under side of the body of the casing near the portion 5, by means of screws 23, the said screws being passed through the bottom of the body into engagement with the turn table section. This turn table has a central polygonal opening for receiving the polygonal portion 24 of a supporting shaft 25. The portion 22 of the turn table has radial recesses as shown, for receiving balls $25^a$, and the other section 25 of the turn table is in the form of a sleeve 26 having a partition 27 near its upper end.

The balls $25^a$ rest on the partition 27 and they are of a size to space the section 22 slightly above the upper end of the section 26 and to space the bottom of the section 22 slightly above the upper surface of the partition. The diaphragm has a central opening for receiving the shaft 25, and the lower end of the sleeve 26 is provided with a mutilated radial flange 29. This flange 29 rests upon the cover plate 30 of a casing 31, and is secured thereto by screws as shown, and the casing has a segmental outline as shown in Fig. 10.

The cover 30 is secured to the upper edge of the casing 31 by means of screws 32, and the cover has an opening through which the shaft 25 extends. The shaft 25 has a polygonal portion 33 near its lower end, and this polygonal portion is within the casing 31. The lower end of the shaft fits within a stepped bearing 34 in the bottom of the casing 31, and the body of the shaft is journaled in the top or cover 30 of the casing.

The upper end of the shaft 25 has a reduced threaded stem 35, and this stem which extends into the body 3 of the casing is engaged by a nut 36. Since that portion of the shaft which fits the central opening in the section 22 of the turn table is polygonal in cross section, it will be obvious that when the shaft is turned the signal casing will be turned therewith riding on the balls $25^a$. The polygonal portion 33 of the shaft is as before stated, in the casing 31, and this portion is received within a bearing 37 of a blade or vane 38, the said bearing having a polygonal opening fitting the shaft.

It will be obvious from the description that when the vane or blade 38 is swung in the casing the signal casing 3—5—6 will be moved therewith. A plurality of coil springs 39 is arranged within the turn table section 26 below the partition and between the same and the cover 30, and these springs are oppositely arranged and normally hold the signal casing with its long axis parallel with the long axis of the motor vehicle.

When the signal or indicator casing is turned in either direction, that is, to the right or left, as soon as the force tending to turn the casing in such direction is relaxed the casing will swing back to normal position under the influence of that spring which has been placed under tension.

The vane or blade 38 is moved by fluid under pressure, as for instance, compressed air, and in order that the vane or blade may be moved in either direction the rear wall of the casing is provided with inlet ports 40 and $40^a$ arranged on opposite sides of the portion 33 of the shaft 25. These ports are engaged by pipes 41 and $41^a$, and it will be noticed that the rear wall of the casing is recessed to fit the bearing 37.

The signal and its operating mechanism are mounted on the filling nipple 42 of the hood of the vehicle 1, and they are connected to the nipple by means of a split ring 43. This ring has radial lugs 44 at its ends, and it is clamped on the hood by bolts 45, passing through the lugs.

A supporting plate 46 is provided for supporting the casing 31, the bottom of the said casing resting on the upper face of the plate, and the plate is secured to the casing by screws 47. The plate has a flange 48 at its front or rounded edge fitting the curved wall of the casing, and the plate is also provided at the opposite side from the flange 48 with an upstanding lug which is recessed on the face remote from the nipple as indicated at 50 in Fig. 2 to receive the ring 43. When the ring is tightened on the filling nipple with the lug 49 between the ring and the filling nipple it will be evident that the lug will be pressed against the filling nipple and since the ring engages a transverse recess the lug cannot move downward and the plate 46 as well as the signal, and its operating mechanism is thus supported by the filling nipple. A casing 51 is provided inclosing the casing 31, the cover 30 and the turn table section, the said casing extending from the under side of the body 3 of the indicator to the supporting plate 46.

The motive fluid which may be a suitable liquid, flows to and from the casing 31 through the pipes 41 and $41^a$. These pipes are connected to the casing 31 at opposite sides of the piston or vane 38, and it will be obvious that when the motive fluid is admitted through one pipe and permitted to exhaust through the other, the vane 38 will be moved, depending upon the direction of the flow of the motive fluid.

In Fig. 9 the controlling mechanism for the motive fluid is shown. The said mechanism comprises a cylinder 52, having one end closed as indicated at 53, and the other end is threaded into an annular rib 54 on a head 55, which closes the open end. This head is circular and is provided with radial perforated lugs 56 by means of which it may be connected to the foot board 57 of the vehicle. Bolts and nuts 58 are used for making the connection, the bolts being passed through the openings in the lugs and through registering openings in the foot board and being engaged by the nuts above the foot board.

A cup-shaped piston 59 is arranged within the cylinder, and the piston is normally pressed upward by a coil spring 60, which is arranged between the same and the closed end 53 of the casing. A stem 61 is connected with the piston, the stem being threaded into a central opening in the piston and the stem extends through an opening in the foot board and is provided with a head 62 above the foot board.

It will be obvious that when the piston is forced downward by means of the head, the motive fluid will be driven out of the cylinder, and as soon as the pressure is relaxed the spring 60 will move the piston and connected parts upward. The piston has a transverse eccentric port or opening 63, and a valve coöperates with the port or opening. This valve 64 has a stem 65, which extends through the opening 63, and has a T-shaped head above the piston.

When the plunger is depressed as above mentioned the valve 64 will be moved upward and will engage the lower end of the port or passage and close the same. The spring 60 is preferably attached to the bottom of the piston, so that it will not become displaced to close the valve opening or to interfere with the valve. The head 55 is provided with a central opening through which the stem 61 of the plunger extends, and adjacent to this opening the head has a port or passage 66, which is normally closed by a set screw 67. The foot board has an opening at the set screw and by removing the set screw the motive fluid may be admitted to the cylinder. The valve 64—65 is merely a T headed bolt having a washer 64 for the valve.

The pipes 41 and 41ᵃ lead from the opposite sides of the cylinder to their connection with the casing 31, and they are connected as shown in Fig. 11.

It will be evident that the signal may be arranged as shown in Fig. 2, that is, with a representation of the arrow or spear head pointing directly forward and displaying a green light in front and a white and red light at each side. When the chauffeur intends to turn to the right he will press the plunger of the proper controlling device to cause the signal or indicator to swing to the right. Immediately there will be brought to view at the front and at the rear a pointing indicating signal or indicator showing the direction of turn. In day light the signal would be clearly visible pointing in the direction the vehicle intends to turn, while at night a light will be shown having an outline corresponding to that of the signal namely, a pointing arrow or spear head of white with a red circle at the base.

It is obvious that if desired the signal might be with equal facility arranged as shown at the left of Fig. 1 and in Fig. 3. In this arrangement the signal casing 69 is shaped like that shown in Fig. 2, having a white transparent sheet 70 at one end and a circular sheet 71 at the other preferably colored red. The source of light 72 is arranged within the circular portion of the casing, and the indicator or signal is mounted to swing in a vertical plane instead of a horizontal plane. Normally the indicator displays at the rear an arrow or spear head pointing upward in the light and in the dark a white spear head having a red base. When the driver intends to turn to the right for instance, he will swing the signal to point to the right and when he intends to turn to the left he will swing the signal in the opposite direction. The signal is operated by precisely the same mechanism as shown in Fig. 4, the only difference being that the shaft 25 is arranged horizontally instead of vertically.

The casing 73 corresponds to the casing 31 of Fig. 10 and the blade or vane is arranged therein in the same manner. It is obvious that the signals at the front and the rear might be connected to be operated by a common operating mechanism as shown in Fig. 11. In this arrangement each cylinder 52 is connected with the two casings 31 at points such that when the pressure is increased in the casing 31 the vanes or blades 38 will be swung in the same direction.

Since the indicating mechanism is operated by the foot of the driver his hands are left free to control the vehicle. This is a feature of importance since he is not required to remove his hands from the controlling mechanism in order to operate the signaling mechanism.

Furthermore with the signal arranged as shown at the front of Fig. 1, there are no bright lights in front to dazzle the eye and there is no light behind to dazzle the driver. Since when the signal swings in either direction the white and red light is presented to the view of the driver as well as to those in front and rear there can be no possibility of a lack of knowledge on his part as to whether or not the signal is properly placed.

In operation, when it is desired to turn, the driver presses on the proper treadle 62, thus depressing the plunger connected therewith. It will be understood that the pipes 40—40ᵃ, and the casings 31, contain enough liquid to about fill the same, and there is but little liquid in the casings 52. Now, when a plunger is depressed, the valve 64 is closed by the internal pressure and the pressure in the cylinder 52 is transmitted to the casings 31 acting upon the vane 38 and swing such vane and signal connected therewith. There is no impediment to the flow of the liquid on the opposite sides of the vanes, since said liquid may pass from the casing through the pipes, and there is no pressure in that cylinder 52 whose plunger is not being operated, since the pressure therein may pass out freely at the port 63.

It will be understood that both faces of the signal in Fig. 2 are alike, each having a red sheet 8 and a white sheet 4 through which the light may pass. In Fig. 3 however, the back of the casing, that is, that face of the casing toward the vehicle may be solid or opaque, since it is necessary to signal in only one direction. The front signal however, must indicate not only to the traffic officers, pedestrians and others in front of the vehicle but as well to the driver and those coming behind. In the diagrammatic arrangement shown in Fig. 11 when the piston of that cylinder nearest the top of the sheet is depressed the vanes at both sides of the sheet will be moved upward at their free ends to swing the two signals to cause them to swing in the same direction.

I claim:—

1. An indicator or signal for motor vehicles, adapted to be connected with the filling nipple of the hood, said signal comprising a supporting plate having means for connecting it to the nipple, a casing of semicircular shape supported by the plate, a vane pivoted at the center of the casing and mounted to swing from side to side, a shaft to which the vane is connected, said shaft moving with the vane and extending above the casing, and a signal casing connected with the shaft above the first-mentioned casing and mounted to swing with the shaft, said signal casing having open sides and an opening at its front, sheets of translucent material for filling the openings, said vane being adapted to be operated by fluid under pressure, and means for controlling the flow of the fluid to the casing.

2. An indicator or signal for motor vehicles, adapted to be connected with the filling nipple of the hood, said signal comprising a supporting plate having means for connecting it to the nipple, a casing of semicircular shape supported by the plate, a vane pivoted at the center of the casing and mounted to swing from side to side, a shaft to which the vane is connected, said shaft moving with the vane and extending above the casing, and a signal casing connected with the shaft above the first-mentioned casing and mounted to swing with the shaft, said vane being operated by fluid under pressure, and means for supplying fluid to the casing.

3. An indicator for use with motor vehicles to indicate change of direction of motion of the said vehicle, comprising a signal casing having the approximate shape of an arrow, and having its opposite sides closed by translucent sheets and having an opening at its front and a sheet of translucent material closing the opening, a shaft secured at one end to the signal casing, a casing for the motive fluid, the shaft being journaled at its lower end in the casing, and said casing having a vane rigid with the shaft and adapted to be moved from side to side of the casing, fluid controlled means for supplying fluid to the casing at opposite sides of the vane for moving the same, and illuminating means within the signal casing, said sheet at the front of the casing being colored green and the sheets at the sides being white at the front of the casing and red at the rear of the casing.

4. An indicator for use with motor vehicles to indicate change of direction of motion of the said vehicles, comprising a signal casing having the approximate shape of an arrow, and having its opposite sides closed by translucent sheets and having an opening at its front and a sheet of translucent material closing the opening, a shaft secured at one end to the signal casing, a casing for motive fluid, the shaft being journaled at its lower end in the casing, and said casing having a vane rigid with the shaft, and adapted to be moved from side to side of the casing, fluid controlled means for supplying fluid to the casing at opposite sides of the vane for moving the same, and illuminating means within the signal casing.

5. An indicator for motor vehicles, comprising a hollow casing having the approximate outline of an arrow, and having openings in its opposite sides near the front of the casing corresponding to the outline of the casing, and having circular openings at the rear of the said first-named openings, and having an opening in its front at the apex, translucent sheets closing the openings at the front and at the sides, the circular sheets being colored red, the sheet in front being colored green and the other sheets being colored white, means within the casing for illuminating the same, a support for the casing adapted to be connected to the vehicle, said signal casing being connected to the support to swing in a horizontal plane toward either side of the vehicle, springs normally holding the signal casing in parallelism with the long axis of the vehicle, and fluid controlled means for swinging the signal to either side against the resistance of the springs, said means comprising a casing of segmental shape, a vane rigid with the signal pivoted within the casing at the center thereof and adapted to be swung from side to side by fluid under pressure, the springs in connection with the signal normally holding the vane in neutral position, and means under control of the driver for controlling the flow of fluid under pressure to the casing to move the signal.

6. An indicator for motor vehicles, comprising a hollow casing having the approximate outline of an arrow, and having openings in its sides near the front of the casing corresponding to the outline of the casing, and having circular openings at the rear of the said first-named openings and having an opening in its front at the apex, translucent sheets closing the openings at the front and at the sides, the circular sheets being colored red the sheet in front being colored green and the other sheets being colored white, means within the casing for illuminating the same, a support for the casing adapted to be connected to the vehicle, said signal casing being connected to the support to swing in a horizontal plane toward either side of the vehicle, springs normally holding the signal casing in parallelism with the long axis of the vehicle, and fluid controlled means for swinging the signal to either side against the resistance of the springs, said means comprising a casing of segmental shape, a vane rigid with the signal pivoted within the casing at the center thereof and adapted to be swung from side to side by fluid under pressure, the springs in connection with the signal normally holding the vane in neutral position.

7. An indicator for indicating the direction of turn of motor vehicles, comprising a semi-circular casing, a vane pivoted in the casing to swing from side to side thereof, an indicator connected with the vane above the casing and swinging with the vane, springs in connection with the signal for normally holding the same in neutral position, and fluid controlled means for supplying fluid to the casing to move the vane in either direction, said means comprising a plurality of cylinders for attachment to the foot board of a vehicle and connected with the casing one at each side of the vane, a plunger in each cylinder having a stem extending through the upper end of the casing into the vehicle and provided with a head for engagement by the driver to depress the plunger, a spring for returning the plunger, and a check valve in connection with the piston for permitting the passage of air through the piston when it is moved upwardly.

BENJAMIN MINOSAKU TAKAHASHI.

Witnesses:
W. A. LYNN,
S. K. CAMPBELL.